United States Patent [19]

Barbatschi et al.

[11] 3,720,691

[45] March 13, 1973

[54] 2-(3,8-DIOXATRICYCLO[5.1.0.0$^{2,4}$]OCT-5-EN-5-YL)-4H-PYRAN-4-ONE

[75] Inventors: Ferdinand Barbatschi, Montvale, N.J.; Donald Bruce Borders, Suffern; Anthony Joseph Shay, Pearl River, both of N.Y.

[73] Assignee: American Cyanamid Company, Stamford, Conn.

[22] Filed: May 21, 9171

[21] Appl. No.: 145,968

[52] U.S. Cl. ............260/345.9, 424/283, 195/81

[51] Int. Cl. ..............................C07d 7/18
[58] Field of Search.....................260/245.9

Primary Examiner—Norma S. Milestone
Attorney—Edward A. Conroy, Jr.

[57] ABSTRACT

This disclosure describes 2-(3,8-dioxatricyclo-[5.1.0.0$^{2,4}$]oct-5-en-5-yl)-4H-pyran-4-one, a new compound which exhibits antimicrobial activity. This new compound is formed during the cultivation under controlled aerobic conditions of an undetermined filamentous fungal species NRRL 3938.

1 Claim, No Drawings

2-(3,8-DIOXATRICYCLO[5.1.0.0²,⁴]OCT-5-EN-5-YL)-4H-PYRAN-4-ONE

BRIEF SUMMARY OF THE INVENTION

This invention relates to a new antibiotic, 2-(3,8-dioxatricyclo[5.1.0.0²,⁴]oct-5-en-5-yl)-4H-pyran-4-one, which may be represented by the following structural formula:

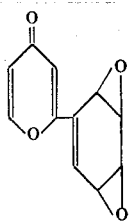

The invention includes within its scope the antibiotic compound in dilute forms, as crude concentrates, and in pure crystalline form as well as methods of preparing the antibiotic. This novel compound possesses broad-spectrum antibiotic activity in vitro against Gram-negative and Gram-positive bacteria.

DETAILED DESCRIPTION OF THE INVENTION

The new compound 2-(3,8-dioxatricyclo[5.1.0.0²,⁴]-oct5-en-5-yl)-4H-pyran-4-one is formed during the cultivation under controlled aerobic conditions of an undetermined filamentous fungal species which we have denominated culture Z1220. This new antibiotic-producing fungal species was isolated from a soil sample. A viable culture of the organism has been deposited with the Culture Collection Laboratory, Northern Utilization Research and Development Division, U.S. Department of Agriculture, Peoria, Ill. and has been added to its permanent collection under its accession number NRRL 3938.

DESCRIPTION OF THE ORGANISM

Culture Z1220 was grown on several diagnostic media which normally support good growth and sporulation of fungal cultures. Culture Z1220 exhibited good mycelial development, but failed to produce spore types useful for taxonomic purposes. It did, however, produce abundant chlamydospores, but these are of little diagnostic value since they are commonly produced by a diversity of organisms. In the absence of suitable taxonomic criteria for finite identification, the organism will have to remain an undetermined chlamydospore-producing fungal species. Following is a detailed description of culture Z1220:

Cultures on malt extract agar spreading rapidly, covering the Petri dish in 14 days. Growth grayish-white, thin, heaviest in central zones; reverse yellowish. Mycelium septate, 3–4μ in diameter, becoming thicker (6–8μa) with age. Chlamydospores produced abundantly both terminally and intercallary, mostly globose, ranging from 6–24μ in diameter, averaging about 15μ. No other spore types produced.

Cultures on potato dextrose agar spreading rapidly, covering the Petri dish in 14 days. Growth yellowish-white, thin, becoming strongly zonate in wide bands. Reverse yellowish-brown. Chlamydospores formed as on malt extract agar. No other spore types produced.

Cultures on Czapek's solution agar effuse, covering the Petri dish in 14 days. Growth colorless, very thin, reverse also colorless. Occasional chlamydospores formed. No other spore types observed.

Cultures on corn meal agar effuse, spreading rapidly, covering the Petri dish in 14 days. Growth whitish, very thin, reverse whitish. Chlamydospores produced sparingly. No other spore types produced.

It is to be understood that for the production of the new antibiotic, 2-(3,8-dioxatricyclo[5.1.0.0²,⁴]oct-5-en-5-yl)--4H-pyran-4-one, the present invention is not limited to this particular organism only, nor to organisms fully answering the above growth and microscopic characteristics which are given for illustrative purposes. In fact, it is desired and intended to include the use of mutants produced from the described organism by various means such as X-radiation, ultraviolet radiation, nitrogen mustard, phage exposure, and the like.

THE FERMENTATION PROCESS

Cultivation of the organism Z1220 may be carried out in a wide variety of liquid culture media. Media which are useful for the production of the novel antibiotic include an assimilable source of carbon such as starch, sugar, molasses, glycerol etc., an assimilable source of nitrogen such as protein, protein hydrolysate, polypeptides, amino acids, corn steep liquor, etc. and inorganic anions and cations, such as potassium, sodium, calcium, sulfate, phosphate, chloride, etc. Trace elements such as boron, molybdenum, copper, etc. are supplied as impurities of other constituents of the media. Aeration is provided by forcing sterile air through or onto the surface of the fermenting medium. Agitation is provided by a mechanical impeller. An antifoaming agent such as 1 percent octadecanol in lard oil may be added as needed.

INOCULUM PREPARATION

Inoculum is prepared by inoculating portions of sterile liquid medium with scrapings or washings of spores from an agar slant of culture Z1220. The following medium may be used:

| | |
|---|---|
| Soybean meal | 10 gm/liter |
| Glucose | 20 gm/liter |
| Corn steep liquor | 5 gm/liter |
| Calcium carbonate | 3 gm/liter |
| Water    qs to | 1 liter |

The inoculated medium is incubated at 24°–30° C. under aeration for 48–72 hours. Two hundred milliliter portions are used to inoculate 12-liter batches of the same medium in a 20-liter glass fermentor. The inoculum mash is aerated with sterile air while growth is continued for 48–72 hours. This in turn is used to inoculate a tank fermentor.

TANK FERMENTATION

The inoculum, prepared as described above, is used to seed the following fermentation medium in tank fermentors:

| | |
|---|---|
| Cane molasses | 20 gm/liter |
| Glucose | 10 gm/liter |
| Soy flour | 10 gm/liter |
| Corn steep liquor | 5 gm/liter |
| Calcium carbonate | 3 gm/liter |
| Water    qs to | 1 liter |

Each tank is inoculated with 3 percent to 10 percent of inoculum prepared as described above. Aeration is supplied at the rate of 0.5–1.0 liter of sterile air per liter of mash per minute and the fermenting mixture is agitated by an impeller driven at 200–400 r.p.m. The temperature is maintained at 25°–30° C., usually at 28° C. The fermentation is continued for 120–160 hours and then harvested.

ISOLATION PROCEDURE

The harvested mash is filtered and the filtrate is adjusted to pH 7.0 with dilute sodium hydroxide and extracted with chloroform. The resulting extract is concentrated to dryness under reduced pressure. The residual mass is dissolved in chloroform. The solution is mixed with acetone and chilled. The crystalline product which separates is filtered off, washed with acetone, and dried in vacuo at room temperature.

ANTIMICROBIAL CHARACTERISTICS

The novel compound of the present invention is useful as an antimicrobial agent and possesses broad spectrum activity in vitro against Gram-negative and Gram-positive bacteria. This activity is determined against a variety of standard laboratory microorganisms as determined by the agar-dilution technique. In this assay, the compound to be tested is dissolved in dimethylsulfoxide so that 10.0 mg. of test compound is contained per milliliter of solution. Observing sterile techniques, tenfold serial dilutions are made of the test solution. Two-tenths ml., 0.1 ml. and 0.05 ml. amounts of the original solution and of each of the decimal dilutions are then added to and mixed with 20 ml. of warm sterile asparagine-meat extract agar capable of supporting growth of the test cultures. The standard sterile nutrient agar solutions containing the different dilutions of the test compound, along with suitable and comparable control dilutions containing no test compound, are then allowed to cool in Petri dishes thereby forming solid agar plates. The test organisms are prepared for use by growing on Trypticase Soy agar overnight. The organisms are harvested from mature agar slant cultures and are suspended in sterile physiological saline solution. Using the Steers Replicator, a standardized amount of the resulting live suspensions is then, still employing sterile techniques, imprinted upon the surfaces of each of the agar plates and the resulting inoculated plates are then incubated. After an appropriate period of time, each of the inoculated areas on each of the plates is inspected visually and the extent, if any, of growth is noted. The minimal inhibitory concentration (mcg./ml.) is defined as the concentration of test compound causing complete inhibition of any particular organism.

In a representative operation, the minimal inhibitory concentrations of the compound of this invention against standard laboratory microorganisms, as determined in the above-described assay are set forth in Table I below:

TABLE I

| ORGANISM | Minimal Inhibitory Concentration (mcg/ml) |
| --- | --- |
| *Bacillus cereus* ATCC 10702 | 250 |
| *B. subtilis* ATCC 6633 | 50 |
| *Corynebacterium xerosis* NRRL-B 1397 | 250 |
| *Sarcina lutea* ATCC 9341 | 250 |
| *Staphylococcus aureus* Smith ATCC 13709 | 250 |
| *S. epidermidis* ATCC 12228 | 250 |
| *Streptococcus faecalis* ATCC 8043 | 250 |
| *S. pyogenes* C203 | 100 |
| *Streptococcus* sp. gamma-hemolytic No. 11 | 250 |
| *Streptococcus* sp. beta-hemolytic No. 80 | 250 |
| *Alcaligenes* sp. ATCC 10153 | 100 |
| *Enterobacter cloacae* ATCC 222 | 250 |
| *Escherichia coli* ATCC 10536 | 250 |
| *Klebsiella pneumoniae* AD | 100 |
| *Proteus mirabilis* ATCC 4681 | 250 |
| *P. morganii* ATCC 8019 | 250 |
| *P. vulgaris* ATCC 6380 | 100 |
| *Pseudomonas aeruginosa* ATCC 10145 | 250 |
| *Salmonella typhosa* ATCC 6539 | 50 |
| *Shigella flexneri* I | 250 |

The high in vitro antibacterial activity of the novel compound of the present invention makes it useful as an additive to materials which are subject to microbial deterioration such as cutting oils and fuel oils. It is also useful in soaps, shampoos, and topical compositions for the treatment of wounds and burns.

The invention will be described in greater detail in conjunction with the following specific examples.

EXAMPLE 1

Inoculum Preparation

A typical medium used to grow the inoculum was prepared according to the following formula:

| | |
| --- | --- |
| Soy flour × 200 | 10 gm/liter |
| Glucose | 20 gm/liter |
| Corn steep liquor | 5 gm/liter |
| Calcium carbonate | 3 gm/liter |
| Water qs to | 1 liter |

Scrapings from an agar slant of culture Z1220 were used to inoculate two 500 ml. flasks each containing 100 milliliters of the above sterile medium. The flasks were placed on a rotary shaker and agitated vigorously for 48 hours at 28° C. The resulting flask inoculum was transferred to a 20 liter glass fermentor containing 12 liters of the above sterile medium. The glass fermentor was aerated with sterile air while growth was carried out for 48 hours at 28° C. after which the contents were used to seed a 300 liter tank fermentor.

EXAMPLE 2

Fermentation

Twelve liters of inoculum prepared as described in Example 1 was used to seed 300 liters of medium of the following formulation:

| | |
| --- | --- |
| Cane molasses | 20 gm/liter |
| Glucose | 10 gm/liter |
| Soy flour (× 200) | 10 gm/liter |
| Corn steep liquor | 5 gm/liter |
| Calcium carbonate | 3 gm/liter |
| Water qs to | 1 liter |

The fermentation was carried out at 28° C. for 140 hours. Aeration was supplied at the rate of 0.5 liters of sterile air per liter of mash per minute. The mash was agitated by an impeller driven at 300 revolutions per minute.

EXAMPLE 3

Isolation

The 300 liters of harvested mash was filtered. The filtrate was adjusted to pH 7.0 with dilute sodium hydroxide and extracted with 150 liters of chloroform. The resulting extract was concentrated to dryness under vacuum at a temperature below 40° C. The residual mass was dissolved in about 1 liter of chloroform. The solution was filtered, mixed with 2 liters of acetone and maintained at 4° C. for 20 hours. The 58 gm. of crystalline product which separated was filtered off, washed with a small volume of acetone, and dried in vacuo at room temperature. The product was isolated as colorless needles, melting point 148° C. (decomposition); U.V. $\lambda_{max.}^{CH_3OH}$ 269 nm ($\epsilon$ 16,800); $[\alpha]_D^{25} = -123$ (C 0.591 $CHVl_3$).

We claim:

1. The compound 2-(3,8-dioxatricyclo[5.1.0.0$^{2,4}$] oct-5-en-5-yl)-4H-pyran-4-one represented by the formula:

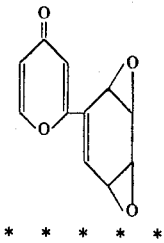

* * * * *